(12) United States Patent
Kataoka

(10) Patent No.: US 11,668,384 B2
(45) Date of Patent: Jun. 6, 2023

(54) GEAR DEVICE AND ROBOT

(71) Applicant: SEIKO EPSON CORPORATION, Tokyo (JP)

(72) Inventor: Yuya Kataoka, Azumino (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 17/547,270

(22) Filed: Dec. 10, 2021

(65) Prior Publication Data

US 2022/0186821 A1  Jun. 16, 2022

(30) Foreign Application Priority Data

Dec. 11, 2020  (JP) .............................. JP2020-205635

(51) Int. Cl.
*F16H 49/00* (2006.01)
*B25J 9/10* (2006.01)

(52) U.S. Cl.
CPC ............ *F16H 49/001* (2013.01); *B25J 9/102* (2013.01); *F16H 2049/003* (2013.01)

(58) Field of Classification Search
CPC ............. F16H 49/001; F16H 2049/003; F16H 2049/006; B25J 9/1025
See application file for complete search history.

(56) References Cited

U.S. PATENT DOCUMENTS

| 5,850,765 A | * | 12/1998 | Shirasawa | ............. F16H 49/001 475/162 |
| 6,202,508 B1 | * | 3/2001 | Takizawa | ............. F16H 49/001 74/411 |
| 2018/0187763 A1 | * | 7/2018 | Xie | ........................ F16H 49/001 |
| 2019/0277383 A1 | * | 9/2019 | Takizawa | .................. F16H 1/32 |

FOREIGN PATENT DOCUMENTS

| JP | 09273609 A | * | 10/1997 | ........... F16H 49/001 |
| JP | 3580506 B2 | * | 10/2004 | ........... F16H 49/001 |
| WO | 2018100701 A1 | | 6/2018 | |

* cited by examiner

*Primary Examiner* — Bobby Rushing, Jr.
(74) *Attorney, Agent, or Firm* — Gang Yu

(57) ABSTRACT

A gear device includes an internal gear, an external gear, and a wave generator. The external gear includes a cylinder section, a diaphragm, and a boss section. The diaphragm includes a first coupling section, a second coupling section, and a diaphragm main body. A ratio of the length from one opening end of the cylinder section to the surface of the diaphragm on the opposite side of the opening end in a rotation axis direction to the length from the inner circumferential surface of the boss section coupled to the second coupling section to the outer circumferential surface of the cylinder section in the radial direction is 1.0 or more and 5.0 or less, and $t(C) \geq t(A)$, where $t(A)$ represents the thickness of the inner circumferential end of the diaphragm and $t(C)$ represents the thickness of the outer circumferential end.

7 Claims, 6 Drawing Sheets

GEAR DEVICE AND ROBOT

The present application is based on, and claims priority from JP Application Serial Number 2020-205635, filed Dec. 11, 2020, the disclosure of which is hereby incorporated by reference herein in its entirety.

BACKGROUND

1. Technical Field

The present disclosure relates to a gear device and a robot including the gear device.

2. Related Art

In WO2018/100701 (Patent Literature 1) discloses a thickness shape of a diaphragm for reducing fatigue fracture at high load torque in a wave speed reducer (a gear device). In the wave speed reducer, when the distance in a rotation axis direction between a diaphragm of an external gear and a wave generator is short, force applied to the diaphragm is larger compared with when the distance is long. The fatigue fracture is more likely to occur. In Patent Literature 1, the short distance in the rotation axis direction between the diaphragm and the wave generator is not taken into account.

SUMMARY

A gear device includes: an internal gear; an external gear having flexibility and configured to partially mesh with the internal gear and rotate around a rotation axis relatively to the internal gear; and a wave generator configured to come into contact with an inner circumferential surface of the external gear and move a meshing position of the internal gear and the external gear in a circumferential direction around the rotation axis. The external gear includes a cylinder section, a diaphragm extending to a radial direction outer side of the cylinder section, and an annular boss section coupled to an outer circumferential end side of the diaphragm. The diaphragm includes a first coupling section coupled to an end portion of the cylinder section, a second coupling section coupled to an inner circumferential surface of the boss section, and a diaphragm main body coupled to the first coupling section and the second coupling section. A ratio of length from one opening end of the cylinder section to a surface of the diaphragm on an opposite side of the opening end in the rotation axis direction to length from the inner circumferential surface of the boss section coupled to the second coupling section to an outer circumferential surface of the cylinder section in the radial direction is 1.0 or more and 5.0 or less and $t(C) \geq t(A)$, where $t(A)$ represents thickness of an inner circumferential end of the diaphragm and $t(C)$ represents thickness of the outer circumferential end.

A robot includes: a first member; a second member configured to turn with respect to the first member; a gear device configured to transmit a driving force for turning the second member relatively to the first member; and a driving source configured to output the driving force to the gear device.

DESCRIPTION OF EXEMPLARY EMBODIMENTS

Figure 1:
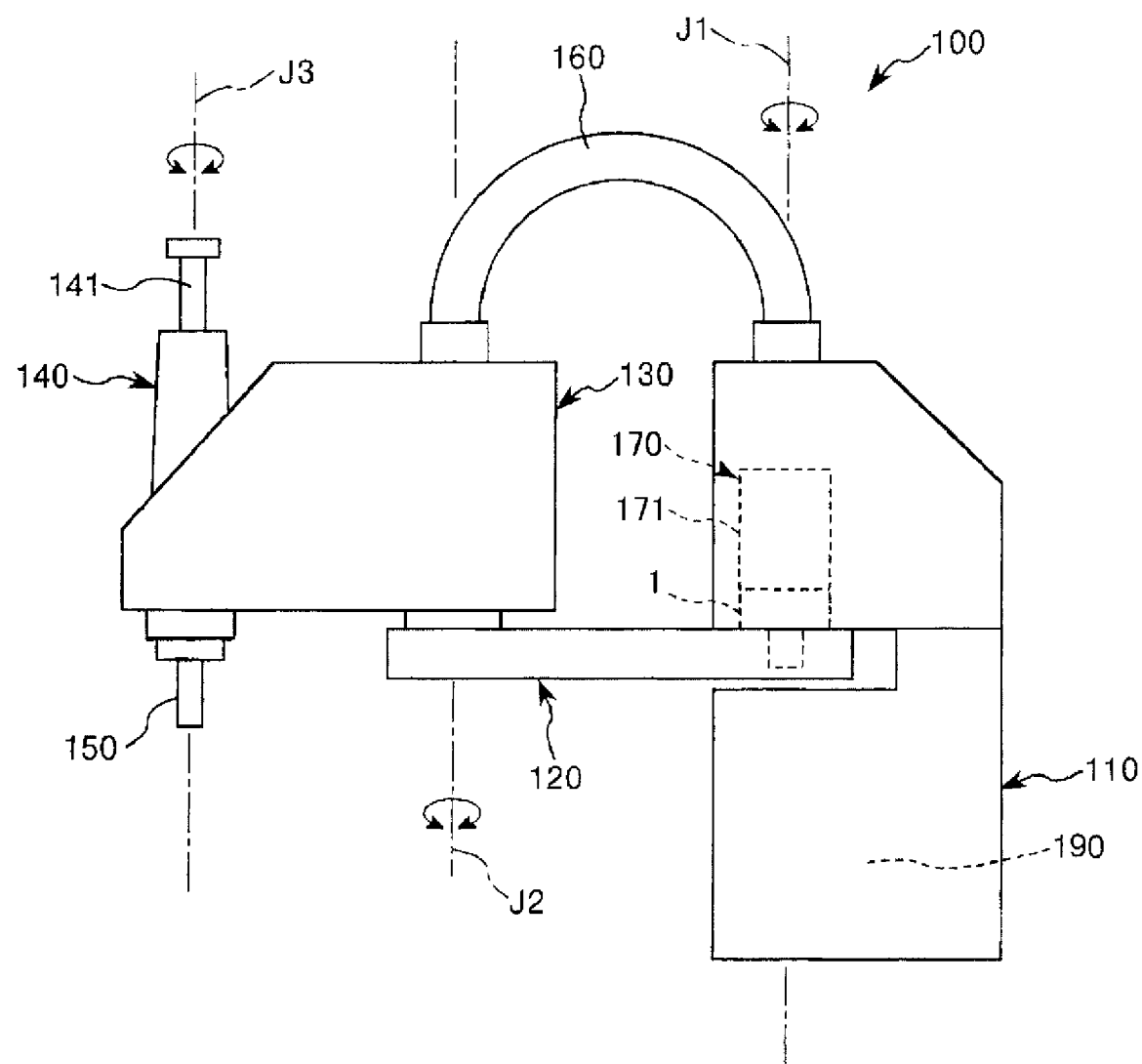
FIG. 1 is a side view showing a schematic configuration of a robot according to the embodiment.

FIG. 1 is a side view showing a schematic configuration of a robot 100 according to an embodiment. In the following explanation, for convenience of explanation, the upper side in a diagram view of FIG. 1 is referred to as "upper" and the lower side in the diagram view is referred to as "lower". A base 110 side in FIG. 1 is referred to as "proximal end side" and the opposite side of the base 110 side, that is, an end effector 150 side is referred to as "distal end side". An up-down direction in the drawing view of FIG. 1 is represented as the "vertical direction" and the left-right direction in the drawing view of FIG. 1 is represented as "the horizontal direction". Further, a direction in which a rotation axis Ja explained below extends is represented as an "axial direction". "Direction" in this specification includes both of a direction on one side along an axis and the opposite direction of the direction on one side.

The robot 100 is briefly explained.

The robot 100 shown in FIG. 1 is a robot used for work such as supply, removal, conveyance, and assembly of a precision instrument and components configuring the precision instrument. The robot 100 includes, as shown in FIG. 1, a base 110, a first arm 120, a second arm 130, a work head 140, an end effector 150, and a pipe 160. "Turn" includes moving in both directions including one direction and the opposite direction of the one direction with respect to a certain center point and rotating with respect to the certain center point.

The sections of the robot 100 are briefly explained.

The base 110 is fixed to, for example, a not-shown floor surface by bolts or the like. A control device 190 that collectively controls the robot 100 is set on the inside of the base 110. The first arm 120 is coupled to the base 110 to be capable of turning with respect to the base 110 around a first axis J1 extending along the vertical direction. That is, the first arm 120 turns relatively to the base 110.

A first driving section 170 is set in the base 110. The first driving section 170 includes a motor 171 (a driving source), which is a first motor such as a servo motor that generates a driving force for turning the first arm 120, and a gear device 1, which is a first speed reducer that decelerates rotation of the motor 171. An input shaft of the gear device 1 is coupled to a rotating shaft of the motor 171. An output shaft of the gear device 1 is coupled to the first arm 120. Therefore, when the motor 171 is driven and a driving force of the motor 171 is transmitted to the first arm 120 via the gear device 1, the first arm 120 turns in the horizontal plane around the first axis J1.

The second arm 130 capable of turning around a second axis J2 with respect to the first arm 120 is coupled to the distal end portion of the first arm 120. In the second arm 130, although not shown in FIG. 1, a second driving section including a second motor that generates a driving force for turning the second arm 130 and a second speed reducer that decelerates rotation of the second motor is set. The driving force of the second motor is transmitted to the second arm 130 via the second speed reducer, whereby the second arm 130 turns with respect to the first arm 120 in the horizontal plane around the second axis J2.

The work head 140 is disposed at the distal end portion of the second arm 130. The work head 140 includes a spline shaft 141 inserted through a not-shown spline nut and a not-shown ball screw nut coaxially disposed at the distal end portion of the second arm 130. The spline shaft 141 is capable of turning around a third axis J3 shown in FIG. 1 and capable of moving in the up-down direction with respect to the second arm 130.

In the second arm 130, although not shown in FIG. 1, a rotary motor and a lifting and lowering motor are disposed. A driving force of the rotary motor is transmitted to the spline nut by a not-shown driving force transmitting mechanism. When the spline nut normally and reversely rotates, the spline shaft 141 normally and reversely rotates around the third axis J3 extending along the vertical direction.

On the other hand, a driving force of the lifting and lowering motor is transmitted to the ball screw nut by the not-shown driving force transmitting mechanism. When the ball screw nut normally and reversely rotates, the spline shaft 141 moves up and down.

The end effector 150 is coupled to the distal end portion of the spline shaft 141. The end effector 150 is not particularly limited. Examples of the end effector 150 include an end effector that grips a conveyed object and an end effector that machines a workpiece.

A plurality of wires coupled to electronic components such as the second motor, the rotary motor, and the lifting and lowering motor disposed in the second arm 130 are drawn around to the inside of the base 110 through the pipe 160 that couples the second arm 130 and the base 110. Further, the plurality of wires are collected in the base 110 to thereby be drawn around to the control device 190 set in the base 110 together with wires coupled to the motor 171 and a not-shown encoder.

As explained above, the robot 100 includes the base 110, which is a first member, the first arm 120, which is a second member provided to be capable of turning with respect to the base 110, the gear device 1 that transmits a driving force from one side to the other side of the base 110 and the first arm 120, and the motor 171, which is the driving source that outputs a driving force to the gear device 1.

The first arm 120 and the second arm 130 may be collectively grasped as the "second member". The "second member" may further include the work head 140 and the end effector 150 in addition to the first arm 120 and the second arm 130.

In this embodiment, the first speed reducer is configured by the gear device 1. However, the second speed reducer may be configured by the gear device 1 or both of the first speed reducer and the second speed reducer may be configured by the gear device 1. When the second speed reducer is configured by the gear device 1, the first arm 120 only has to be grasped as the "first member" and the second arm 130 only has to be grasped as the "second member".

In this embodiment, the motor 171 and the gear device 1 are provided in the base 110. However, the motor 171 and the gear device 1 may be provided in the first arm 120. In this case, the output shaft of the gear device 1 only has to be coupled to the base 110.

A horizontal articulated robot is illustrated as the robot 100 in this embodiment. However, the robot according to the present disclosure is not limited to the horizontal articulated robot. For example, the number of joints of the robot is optional. The robot according to the present disclosure is applicable to a vertical articulated robot as well.

Figure 2:
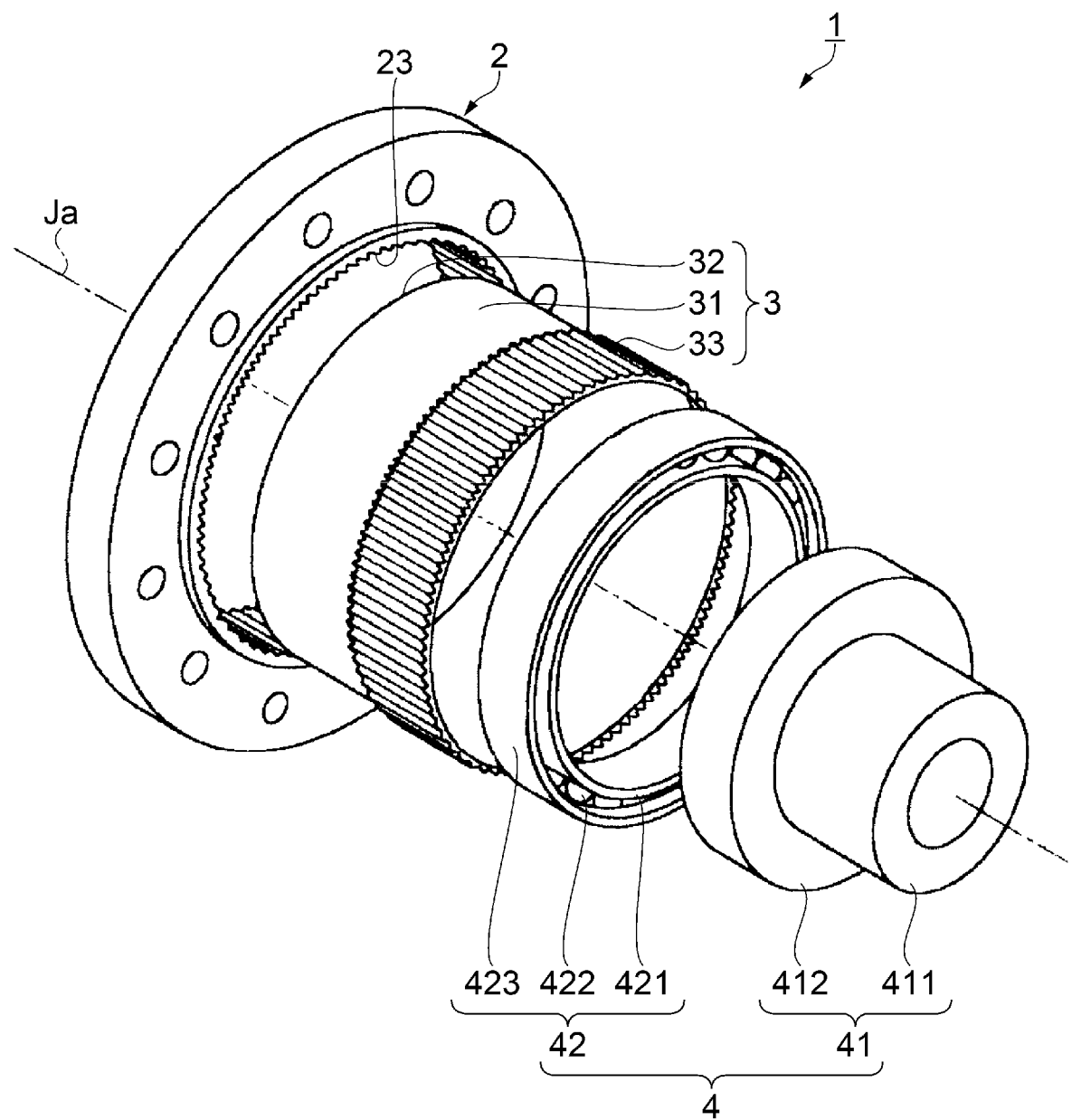
FIG. 2 is an exploded perspective view showing a gear device according to the embodiment.
Figure 3:
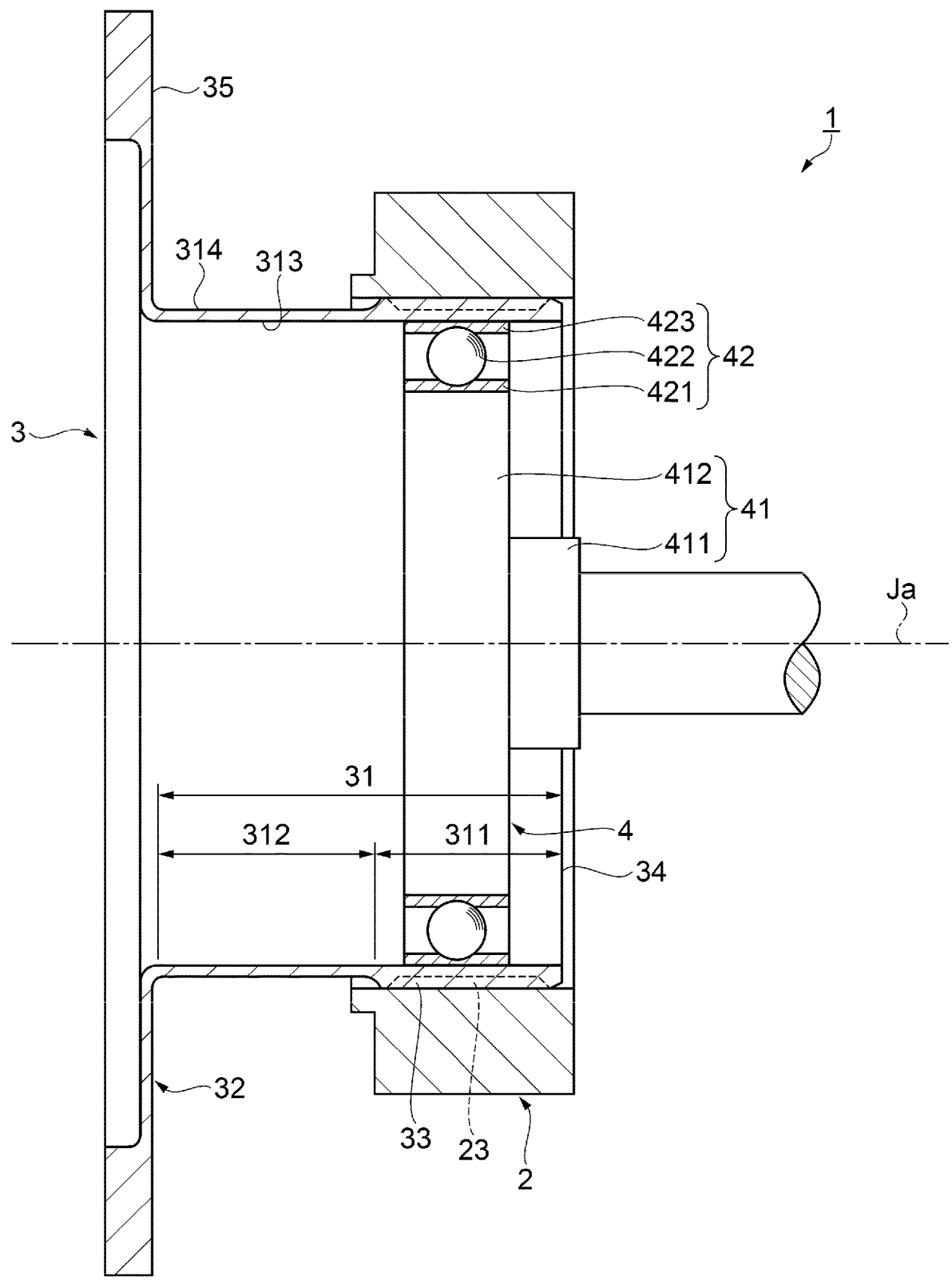
FIG. 3 is a longitudinal sectional view of the gear device.
Figure 4:
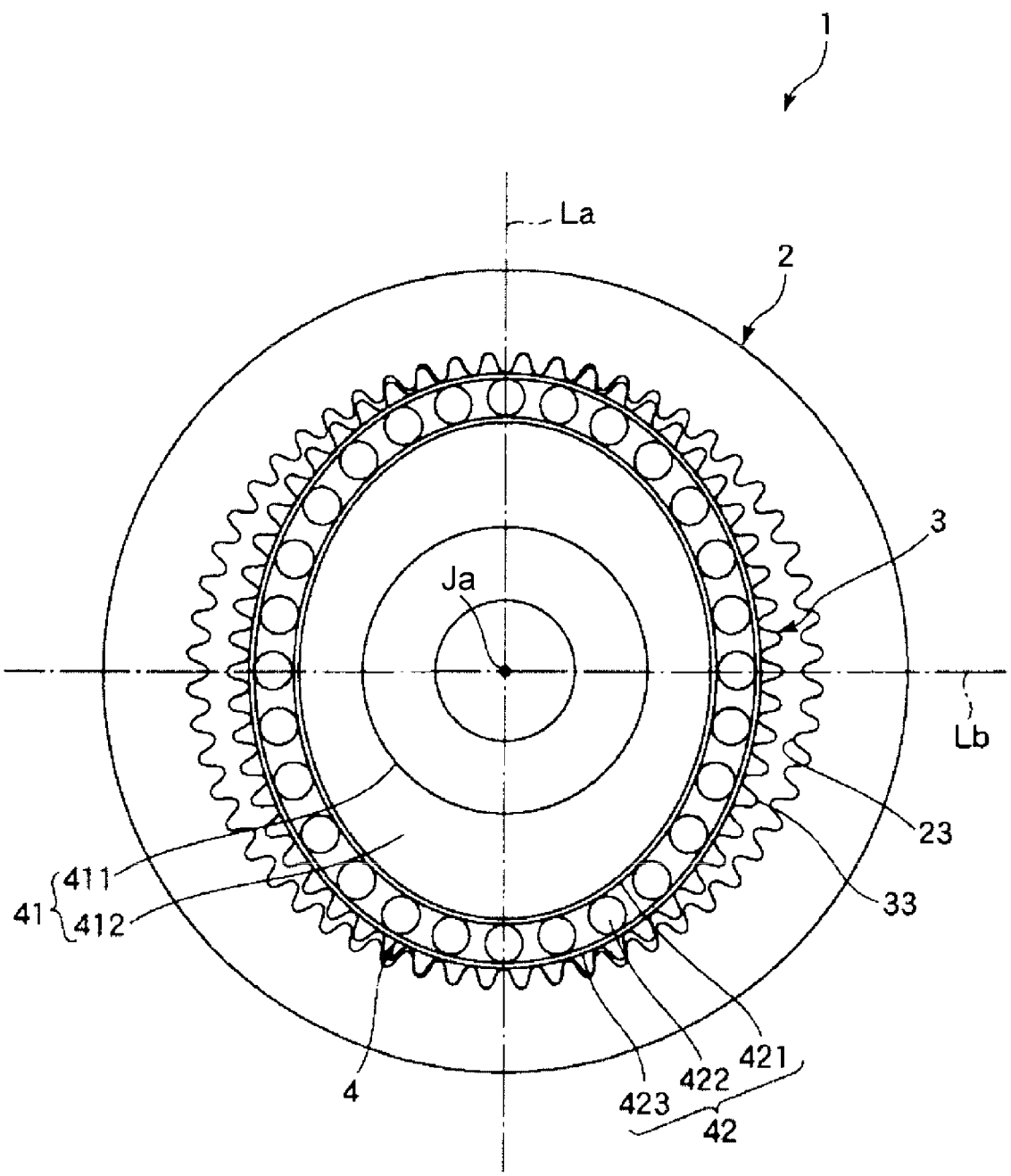
FIG. 4 is a diagram showing a meshing state of teeth of the gear device.

FIG. 2 is an exploded perspective view showing the gear device 1 according to this embodiment. FIG. 3 is a longitudinal sectional view of the gear device 1. FIG. 4 is a diagram showing a meshing state of teeth of the gear device 1. In the figures referred to below, for convenience of explanation, dimensions of the sections are exaggerated and shown as appropriate according to necessity. The dimensions of the sections do not always coincide with actual dimensions. In FIG. 2, for convenience of illustration, a part of an external gear 3, specifically, a diaphragm 32 is omitted.

The gear device 1 is explained.

The gear device 1 shown in FIG. 2 is a wave gear device and is used as, for example, a speed reducer. The gear device 1 includes an internal gear 2, an external gear 3 provided on the inner side of the internal gear 2 and having a silk hat shape and flexibility, and a wave generator 4 provided on the inner side of the external gear 3 and including a bearing 42. Although not shown in FIG. 2, a lubricant such as grease is disposed as appropriate in sections of the gear device 1, specifically, a meshing section of the internal gear 2 and the external gear 3, a fitting section of the external gear 3 and the wave generator 4, and the like.

One of the internal gear 2, the external gear 3, and the wave generator 4 is coupled to the base 110 of the robot 100 explained above. Another one is coupled to the first arm 120 of the robot 100 explained above. In this embodiment, the internal gear 2 is fixed to the base 110, the external gear 3 is coupled to the first arm 120, and the wave generator 4 is coupled to a rotating shaft (not shown) of the motor 171.

Therefore, when the rotating shaft of the motor 171 rotates, the wave generator 4 rotates at the same rotating speed as rotating speed of the rotating shaft of the motor 171. Since the internal gear 2 and the external gear 3 have different numbers of teeth each other, the internal gear 2 and the external gear 3 relatively rotate around the rotation axis Ja because of the difference between the numbers of teeth while a meshing position of the internal gear 2 and the external gear 3 moves in the circumferential direction. In this embodiment, since the number of teeth of the internal gear 2 is larger than the number of teeth of the external gear 3, it is possible to rotate the external gear 3 at rotating speed lower than the rotating speed of the rotating shaft of the motor 171. That is, it is possible to realize a speed reducer including the wave generator 4 on an input shaft side and including the external gear 3 on an output shaft side.

A coupling form of the internal gear 2, the external gear 3, and the wave generator 4 is not limited to the form explained above. For example, the gear device 1 can be used as the speed reducer even if the external gear 3 is fixed to the base 110 and the internal gear 2 is coupled to the first arm 120. The gear device 1 can be used as the speed reducer even if the external gear 3 is coupled to the rotating shaft of the motor 171. In this case, the wave generator 4 only has to be fixed to the base 110 and the internal gear 2 only has to be coupled to the first arm 120.

The configuration of the gear device 1 is briefly explained.

As shown in FIGS. 2 to 4, the internal gear 2 is a gear configured by a rigid body that does not substantially bend in the radial direction and is a ring-like gear including internal teeth 23. In this embodiment, the internal gear 2 is a spur gear. Therefore, the internal teeth 23 have a tooth trace parallel to the rotation axis Ja. The tooth trace of the internal teeth 23 may be inclined with respect to the rotation axis Ja. That is, the internal gear 2 may be a helical gear or a double helical gear.

The external gear 3 is inserted through the inner side of the internal gear 2. The external gear 3 is a gear having flexibility flexurally deformable in the radial direction and is a gear including external teeth 33 that mesh with the internal teeth 23 of the internal gear 2. The number of teeth of the external gear 3 is smaller than the number of teeth of the internal gear 2. Since the numbers of teeth of the external gear 3 and the internal gear 2 are different from each other in this way, it is possible to realize a speed reducer.

In this embodiment, the external gear 3 is formed in a so-called silk hat shape and includes an opening end 34 at the axial direction right end of FIG. 3. The external gear 3 includes a cylinder section 31 formed in a cylindrical shape around the rotation axis Ja. The cylinder section 31 includes an external-teeth forming section 311, which is a part on the opening end 34 side, and a cylindrical body section 312, which is a part on the opposite side of the opening end 34 and having fixed thickness. The external teeth 33 are formed in a portion on the outer circumferential surface side of the external-teeth forming section 311.

The external gear 3 includes, in addition to the cylinder section 31, the diaphragm 32 coupled to the cylinder section 31 and extending to the radial direction outer side of the cylinder section 31. The external gear 3 includes an annular boss section 35 coupled to the diaphragm 32.

A not-shown output shaft is fixed to the boss section 35 of the external gear 3 by fixtures such as screws. Consequently, the output shaft and the external gear 3 are coupled. A coupling method for the output shaft and the external gear 3 is not limited to this.

As shown in FIGS. 3 and 4, the wave generator 4 is disposed on the inner side of the external gear 3 and is capable of rotating around the rotation axis Ja. As shown in FIG. 4, the wave generator 4 deforms the cross section of the external gear 3 into an elliptical shape or an oval shape having a major axis La and a minor axis Lb to thereby mesh the external teeth 33 with the internal teeth 23 of the internal gear 2. The external gear 3 and the internal gear 2 are capable of rotating around the same rotation axis Ja and are meshed with each other on the inside and the outside.

As explained above, the cylinder section 31 of the external gear 3 includes the external-teeth forming section 311 and the body section 312. The external-teeth forming section 311 is the end portion on the opening end 34 side shown in FIG. 3 and is a portion where the external teeth 33 are provided. The body section 312 is a portion located on the diaphragm 32 side in the cylinder section 31. The external-teeth forming section 311 is a portion where large deformation due to coning occurs. The coning means three-dimensional deformation in which the cylinder section 31 opens to the outer side with respect to the rotation axis Ja in the position of the major axis La shown in FIG. 4 and the cylinder section 31 narrows to the inner side with respect to the rotation axis Ja in the position of the minor axis Lb shown in FIG. 4. When the wave generator 4 is fit in the external gear 3, the external-gear forming section 311 is deformed more largely than the body section 312.

The wave generator 4 is fit in the external-teeth forming section 311 of the external gear 3. The wave generator 4 includes a cam 41 and a bearing 42 attached to the outer circumference of the cam 41. The cam 41 includes a shaft section 411 that rotates around the rotation axis Ja and a cam section 412 that projects to the outer side from one end portion of the shaft section 411. The outer circumferential surface of the cam section 412 is formed in an elliptical shape or an oval shape having the major axis La in the up-down direction and having the minor axis Lb in the left-right direction in a diagram view of FIG. 4 when viewed from a direction along the rotation axis Ja. The bearing 42 is fit in the cam 41 and includes an inner ring 421 and an outer ring 423 having flexibility and a plurality of balls 422 disposed between the inner ring 421 and the outer ring 423.

The inner ring 421 is fit in the outer circumferential surface of the cam section 412 of the cam 41 and is elastically deformed into an elliptical shape or an oval shape along the outer circumferential surface of the cam section 412. According to the elastic deformation, the outer ring 423 is also elastically deformed into an elliptical shape or an oval shape. The outer circumferential surface of the outer ring 423 is in contact with an inner circumferential surface 313 of the cylinder section 31 as shown in FIG. 3. The plurality of balls 422 are held by a not-shown holder to keep constant intervals among the balls 422 in the circumferential direction of the inner ring 421.

According to rotation of the cam 41 around the rotation axis Ja, such a wave generator 4 changes the direction of the cam section 412 and deforms the outer ring 423 according to the change of the direction. Consequently, the wave generator 4 moves the meshing position of the internal gear 2 and the external gear 3 in the circumferential direction. At this time, since the inner ring 421 is fixedly set with respect to the outer circumferential surface of the cam section 412, a deformation state does not change.

Figure 5:
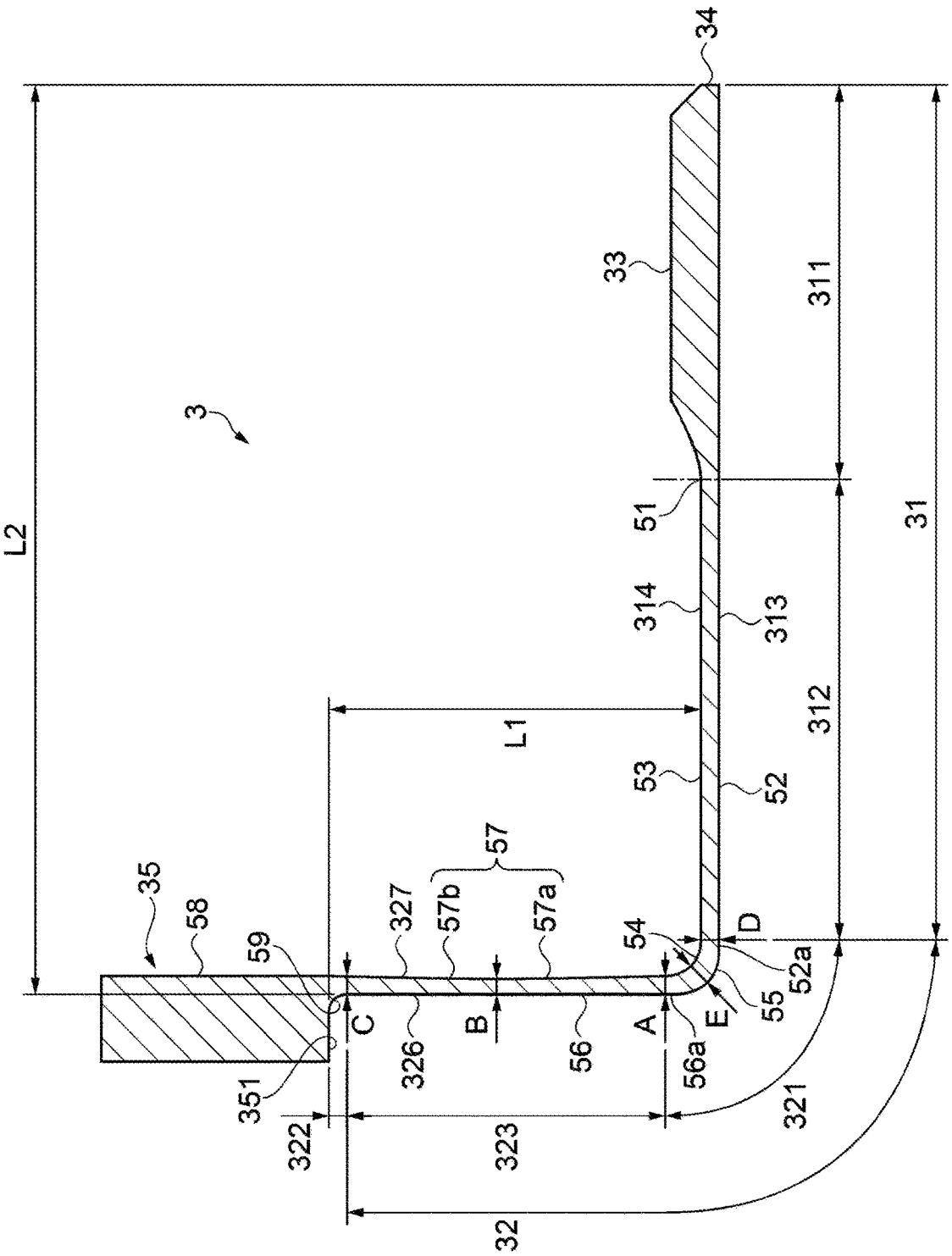
FIG. 5 is a half sectional view of an external gear taken along a plane including a rotation axis.

FIG. 5 is a half sectional view of the external gear 3 taken along a plane including the rotation axis Ja. In FIG. 5, illustration of the rotation axis Ja is omitted.

The external gear 3 is explained in detail.

As explained above, the cylinder section 31 of the external gear 3 includes the external-teeth forming section 311, one end of which is the opening end 34, and the body section 312 having fixed thickness between the external-teeth forming section 311 and the diaphragm 32. The external teeth 33 are formed in a portion on the outer circumferential surface side of the external-teeth forming section 311.

In this embodiment, the thickness of the body section 312 is fixed. However, for example, it is also possible to set a sectional shape of the body section 312 such that the thickness of the body section 312 gradually decreases from the diaphragm 32 side toward the external-teeth forming section 311.

The diaphragm 32 includes a first coupling section 321 coupled to an end portion D of the cylinder section 31 to bend, a second coupling section 322 coupled to an inner circumferential surface 351 of the boss section 35, and a diaphragm main body 323 coupled to the first coupling section 321 and the second coupling section 322.

In other words, the first coupling section 321 continues to an inner circumferential end A of the diaphragm main body 323 and bends in a direction toward the cylinder section 31 along the rotation axis Ja from an inward direction in the radial direction. The end portion D of the cylinder section 31 is connected to the first coupling section 321. In other words, the second coupling section 322 extends outward in the radial direction from an outer circumferential end C of the diaphragm main body 323 and is connected to the inner circumferential surface 351 of the boss section 35. The diaphragm main body 323 extends in the radial direction, which is a direction orthogonal to the rotation axis Ja.

The end portion D of the cylinder section 31 is a bending start part on the cylinder section 31 side of the first coupling section 321. Specifically, the end portion D of the cylinder section 31 is a bending start part on the cylinder section 31 side of a concave arc 54 of the first coupling section 321. The outer circumferential end C of the diaphragm 32 is a part where the surface on a projecting side of the boss section 35 of the diaphragm main body 323 of the second coupling section 322 starts to bend toward the boss section 35 from the diaphragm main body 323. The inner circumferential end A of the diaphragm 32 is a bending start part on the diaphragm main body 323 side of the first coupling section 321. Specifically, the inner circumferential end A of the diaphragm 32 is a bending start part on the diaphragm main body 323 side of the concave arc 54 of the first coupling section 321.

In this embodiment, for example, length L1 from the inner circumferential surface 351 of the boss section 35 coupled to the second coupling section 322 to an outer circumferential surface 314 of the cylinder section 31 is 8 mm or more and 20 mm or less in the radial direction with respect to the rotation axis Ja. Length L2 from one opening end 34 of the cylinder section 31 to a surface 326 of the diaphragm 32 (the diaphragm main body 323) on the opposite side of the opening end 34 is 20 mm or more and 40 mm or less in the rotation axis Ja direction.

Therefore, a ratio of the length L2 from one opening end 34 of the cylinder section 31 to the surface 326 of the diaphragm 32 (the diaphragm main body 323) in the rotation axis Ja direction to the length L1 from the inner circumferential surface 351 of the boss section 35 to the outer circumferential surface 314 of the cylinder section 31 in the radial direction is 1.0 or more and 5.0 or less. In this way, the gear device 1 in this embodiment is a small device formed in a flat shape in which the distance between the diaphragm 32 of the external gear 3 and the wave generator 4 is short in the rotation axis Ja direction.

The external gear 3 is explained more in detail.

When viewed in a cross section, as shown in FIG. 5, the outer circumferential surface 314 of the body section 312 of the cylinder section 31 of the external gear 3 is defined by an outer side straight line 53 extending in parallel to the rotation axis Ja from a part 51 connected to the external-teeth forming section 311 to the end portion D of the body section 312. When viewed in a cross section, the inner circumferential surface 313 of the body section 312 is also defined by an inner side straight line 52 extending in parallel to the rotation axis Ja. Therefore, the body section 312 having the fixed thickness is defined by the outer side straight line 53 and the inner side straight line 52.

When viewed in a cross section, the outer circumferential surface of the first coupling section 321 of the diaphragm 32 connected to the body section 312 is defined by the concave arc 54. One end of the concave arc 54 is smoothly connected to the outer side straight line 53 in the position of the end portion D of the body section 312. When viewed in a cross section, the inner circumferential surface of the first coupling section 321 is defined by a straight line section 52a of the inner side straight line 52 extending beyond the end portion D, a convex arc 55 smoothly connected to the straight line section 52a, and a straight line section 56a smoothly connected to the other end of the convex arc 55 and extending outward in the radial direction.

In the first coupling section 321, a coupling section center position between the inner circumferential end A and the end portion D is represented as E. In the first coupling section 321, a curvature radius of the convex arc 55 on the outer side is set smaller than a curvature radius of the concave arc 54 on the inner side. The thickness of the first coupling section 321 is the largest in the coupling section center position E, gradually increases from the inner circumferential end A to the coupling section center position E, and gradually decreases from the coupling section center position E to the end portion D.

When viewed in a cross section, as shown in FIG. 5, a surface 327 on the cylinder section 31 side of the diaphragm main body 323 connected to the first coupling section 321 is defined by a concave curved line 57.

Substantially the center portion between the inner circumferential end A and the outer circumferential end C in the diaphragm main body 323 is represented as B. The concave curved line 57 is configured from, for example, a concave arc 57a defining the inner circumferential end A to a center portion B and a concave arc 57b defining the center portion B to the outer circumferential end C. One end of the concave arc 57a is smoothly connected to the concave arc 54 in the position of the inner circumferential end A. The other end is smoothly connected to the concave arc 57b.

When viewed in a cross section, as shown in FIG. 5, the surface 326 on the opposite side of the cylinder section 31 side of the diaphragm main body 323 connected to the first coupling section 321 is defined by a straight line section 56 extending beyond the inner circumferential end A from an end of the straight line section 56a. The straight line section 56 extends to the position of the outer circumferential end C along the radial direction orthogonal to the rotation axis Ja.

The thickness of the diaphragm main body 323 specified by the concave curved line 57 and the straight line section 56 is the smallest in the center portion B, gradually increases from the center portion B toward the inner circumferential end A, and gradually increases from the center portion B toward the outer circumferential end C.

Subsequently, when viewed in a cross section, the surface on the cylinder section 31 side of the second coupling section 322 connected to the outer circumferential end C of the diaphragm main body 323 is defined by an arc extending beyond the outer circumferential end C in the concave arc 57b of the concave curved line 57. When viewed in a cross section, an end of the concave arc 57b is connected to a straight line section 58 defining the surface on the same side of the boss section 35.

When viewed in a cross section, the surface on the opposite side of the surface on the cylinder section 31 side of the second coupling section 322 is defined by a concave arc 59 smoothly connected to an end of the straight line section 56 in the position of the outer circumferential end C. The other end of the concave arc 59 is smoothly connected to the inner circumference surface 351 of the boss section 35. The concave arc 59 is formed at a predetermined curvature radius.

Figure 6:
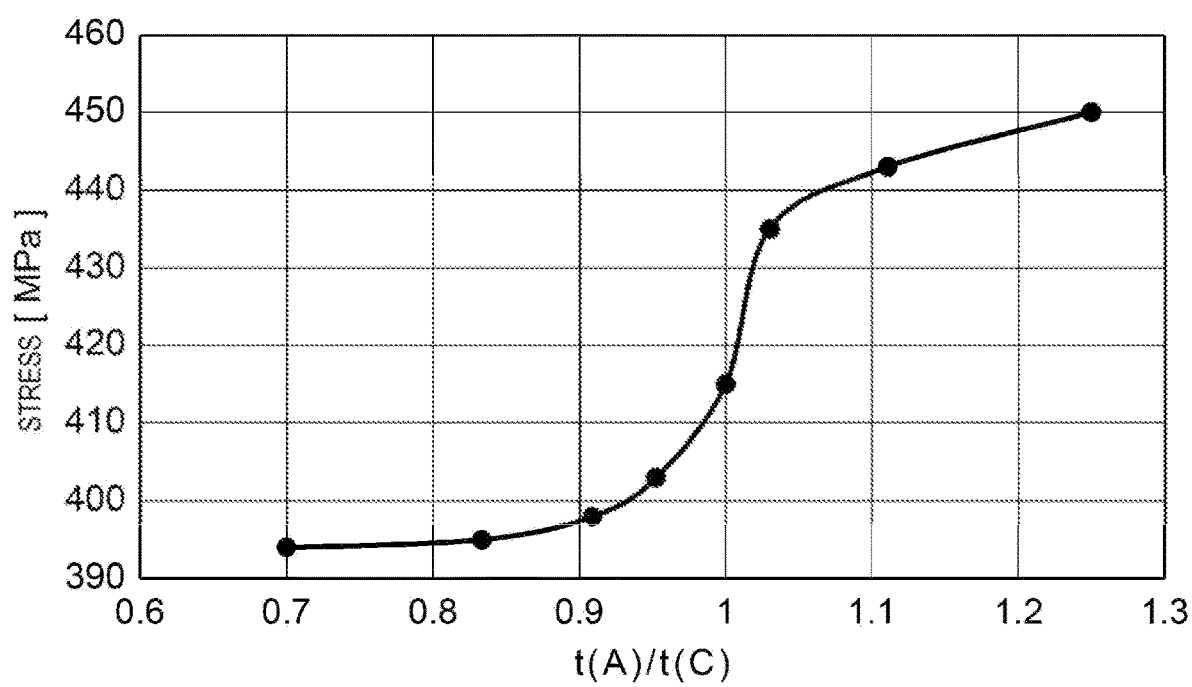
FIG. 6 is a diagram showing a relation between the thickness of a diaphragm and stress.

FIG. 6 is a diagram showing a relation between the thickness of the diaphragm 32 and stress. Specifically, in FIG. 6, when the thickness of the inner circumferential end A of the diaphragm 32 is represented as t(A) and the thickness of the outer circumferential end C is represented as t(C), the horizontal axis indicates t(A)/t(C) and the vertical axis indicates maximum load stress applied to a region extending from the inner circumferential end A to the outer circumferential end C. More load stress is applied to the inner circumferential end A compared with the outer circumferential end C. Therefore, the vertical axis can be grasped as indicating load stress applied to the inner circumferential end A.

As shown in FIG. 6, when t(A)/t(C), which is a ratio of the thickness t(A) of the inner circumferential end A of the diaphragm 32 to the thickness t(C) of the outer circumferential end C of the diaphragm 32, is 0.7 to 1, the load stress applied to the inner circumferential end A increases but does not excessively increase. However, it is seen that, when $t(A)/t(C)$ is larger than 1, in other words, the thickness $t(A)$ of the inner circumferential end A is larger than the thickness $t(C)$ of the outer circumferential end C, the load stress applied to the inner circumferential end A suddenly increases. Further, in other words, when the thickness $t(C)$ of the outer circumferential end C is smaller than the thickness $t(A)$ of the inner circumferential end A, stress is suddenly applied to the outer circumferential end C as well.

Therefore, the thickness $t(A)$ of the inner circumferential end A of the diaphragm 32 with respect to the thickness $t(C)$ of the outer circumferential end C of the diaphragm 32 satisfies $t(C) \geq t(A)$, preferably $0.7 < t(A)/t(C) \leq 1.0$, and more preferably $0.83 \leq t(A)/t(C) \leq 0.98$.

In this embodiment, when the thicknesses of the inner circumferential end A, the center portion B, the outer circumferential end C, and the end portion D in the diaphragm 32 are respectively represented as $t(A)$, $t(B)$, $t(C)$, and $t(D)$, $t(A)$, $t(B)$, $t(C)$, and $t(D)$ are set to be $t(C) \geq t(A) > t(D) > t(B)$.

Specifically, based on the thickness $t(C)$ of the outer circumferential end C that is the thickest among the four parts (the inner circumferential end A, the center portion B, the outer circumferential end C, and the end portion D), the thicknesses of the inner circumferential end A, the center portion B, and the end portion D are preferably set as follows.

As explained above, the thickness $t(A)$ of the inner circumferential end A of the diaphragm 32 with respect to the thickness $t(C)$ of the outer circumferential end C of the diaphragm 32 satisfies $t(C) \geq t(A)$, preferably $0.7 < t(A)/t(C) \leq 1.0$ and more preferably $0.83 \leq t(A)/t(C) \leq 0.98$.

The thickness $t(B)$ of the center portion B of the diaphragm 32 with respect to the thickness $t(C)$ of the outer circumferential end C of the diaphragm 32 satisfies $t(C) \geq t(A) > t(B)$, preferably $0.5 < t(B)/t(C) < 0.9$, and more preferably $0.55 \leq t(B)/t(C) \leq 0.65$.

The thickness $t(D)$ of the end portion D of the cylinder section 31 with respect to the thickness $t(C)$ of the outer circumferential end C of the diaphragm 32 satisfies $t(C) \geq t(A) > t(D)$, preferably $0.5 < t(D)/t(C) < 1.0$, and more preferably $0.6 \leq t(D)/t(C) \leq 0.9$.

The thickness $t(B)$ of the center portion B of the diaphragm 32 and the thickness $t(D)$ of the end portion D of the cylinder section 31 are $t(B) < t(D)$.

According to this embodiment, the following effects can be obtained.

The gear device 1 in this embodiment includes the internal gear 2, the external gear 3, and the wave generator 4. The external gear 3 includes the cylinder section 31, the diaphragm 32, and the boss section 35. The diaphragm 32 includes the first coupling section 321 coupled to the end portion D of the cylinder section 31, the second coupling section 322 coupled to the inner circumferential surface 351 of the boss section 35, and the diaphragm main body 323 coupled to the first coupling section 321 and the second coupling section 322. The end portion D of the cylinder section 31 is the bending start part on the cylinder section 31 side of the first coupling section 321. The outer circumferential end C of the diaphragm 32 is the bending start part on the diaphragm main body 323 side of the second coupling section 322. The inner circumferential end A of the diaphragm 32 is the bending start part on the diaphragm main body 323 side of the first coupling section 321. A ratio of the length from one opening end 34 of the cylinder section 31 to the surface 326 of the diaphragm 32 on the opposite side of the opening end 34 in the rotation axis Ja direction to the length from the inner circumferential surface 351 of the boss section 35 coupled to the second coupling section 322 to the outer circumferential surface 314 of the cylinder section 31 in the radial direction is 1.0 or more and 5.0 or less. When the thickness of the inner circumferential end A of the diaphragm 32 is represented as $t(A)$ and the thickness of the outer circumferential end C is represented as $t(C)$, $t(C) \geq t(A)$.

With this configuration, in the gear device 1, the ratio of the length from the opening end 34 of the cylinder section 31 to the surface 326 of the diaphragm 32 in the rotation axis Ja direction to the length from the inner circumferential surface 351 of the boss section 35 to the outer circumferential surface 314 of the cylinder section 31 in the radial direction is 1.0 or more and 5.0 or less. In this way, when the distance in the rotation axis Ja direction between the diaphragm 32 of the external gear 3 and the wave generator 4 is short, the gear device 1 can withstand stress applied to the diaphragm 32 by setting the thickness $t(C)$ and the thickness $t(A)$ to $t(C) \geq t(A)$. Therefore, when the distance in the rotation axis Ja direction between the diaphragm 32 and the wave generator 4 is short, it is possible to cope with the stress applied to the diaphragm 32. Therefore, it is possible to achieve a reduction in the size of the gear device 1.

In the gear device 1 in this embodiment, the thickness $t(A)$ of the inner circumferential end A of the diaphragm 32 with respect to the thickness $t(C)$ of the outer circumferential end C of the diaphragm 32 satisfies $0.7 < t(A)/t(C) \leq 1.0$ and more preferably $0.83 \leq t(A)/t(C) \leq 0.98$.

With this configuration, the gear device 1 can further withstand the stress applied to the diaphragm 32.

In the gear device 1 in this embodiment, when the thickness of the center portion B of the inner circumferential end A and the outer circumferential end C of the diaphragm 32 is represented as $t(B)$, $t(C) \geq t(A) > t(B)$. The thickness $t(B)$ of the center portion B of the diaphragm 32 with respect to the thickness $t(C)$ of the outer circumferential end C of the diaphragm 32 satisfies $0.5 < t(B)/t(C) < 0.9$ and more preferably $0.55 \leq t(B)/t(C) \leq 0.65$.

With this configuration, in the gear device 1, the center portion B is easily deformed in addition to the inner circumferential end A and the outer circumferential end C of the diaphragm 32. By dispersing and reducing stress concentration on the inner circumferential end A and the outer circumferential end C, it is possible to suppress fatigue fracture of the diaphragm 32.

In the gear device 1 in this embodiment, when the thickness of the end portion D of the cylinder section 31 is represented as $t(D)$, $t(C) \geq t(A) > t(D)$. The thickness $t(D)$ of the end portion D of the cylinder section 31 with respect to the thickness $t(C)$ of the outer circumferential end C of the diaphragm 32 satisfies $0.5 < t(D)/t(C) < 1.0$ and more preferably $0.6 \leq t(D)/t(C) \leq 0.9$.

With this configuration, in the gear device 1, by reducing the thickness of the end portion D of the cylinder section 31 with respect to the thickness of the outer circumferential end C of the diaphragm 32, the end portion D of the cylinder section 31 is also easily deformed. By dispersing and reducing stress concentration on the inner circumferential end A and the outer circumferential end C of the diaphragm 32, it is possible to suppress fatigue fracture of the diaphragm 32.

In the gear device 1 in this embodiment, the thickness $t(B)$ of the center portion B of the diaphragm 32 and the thickness $t(D)$ of the end portion D of the cylinder section 31 are $t(B) < t(D)$.

In the gear device 1, shearing stress in the rotating direction due to load torque is applied to the cross sections of the external gear 3. The shearing stress increases when the distance in the radial direction from the rotation axis Ja is small. Therefore, in the center portion B of the diaphragm 32 where the distance from the rotation axis Ja is longer than the distance from the rotation axis Ja to the end portion D of the cylinder section 31, the shearing stress is smaller compared with the end portion D of the cylinder section 31. Consequently, even if the thickness t(B) of the center portion B of the diaphragm 32 is set smaller compared with the thickness t(D) of the end portion D of the cylinder section 31, the gear device 1 can withstand the shearing stress.

The robot 100 in this embodiment includes the first member (the base 110), the second member (the first arm 120) that turns with respect to the first member (the base 110), the gear device 1 that transmits a driving force for turning the second member (the first arm 120) relatively to the first member (the base 110), and the driving source (the motor 171) that outputs the driving force to the gear device 1. The first arm 120 and the second arm 130 may be collectively grasped as the "second member". The "second member" may further include the work head 140 and the end effector 150 in addition to the first arm 120 and the second arm 130.

When the distance in the rotation axis Ja direction between the diaphragm 32 of the external gear 3 and the wave generator 4 is short, even if stress applied to the diaphragm 32 increases, the gear device 1 can withstand the stress. Therefore, it is possible to achieve a reduction in the size of the gear device 1. Therefore, in the robot 100 including the first member, the second member, the gear device 1, and the driving source, it is possible to achieve a reduction in the size of the robot 100.

What is claimed is:

1. A gear device comprising:
an internal gear;
an external gear having flexibility and configured to partially mesh with the internal gear and rotate around a rotation axis relatively to the internal gear; and
a wave generator configured to come into contact with an inner circumferential surface of the external gear and move a meshing position of the internal gear and the external gear in a circumferential direction around the rotation axis, wherein
the external gear includes a cylinder section, a diaphragm extending toward an outer side in a radial direction of the cylinder section, and an annular boss section coupled to an outer circumferential end of the diaphragm,
the diaphragm includes a first coupling section coupled to an end portion of the cylinder section, a second coupling section coupled to an inner circumferential surface of the boss section, and a diaphragm main body coupled to the first coupling section and the second coupling section,
a ratio of a length from an opening end of the cylinder section to a surface of the diaphragm on an opposite side of the opening end in the rotation axis direction to a length from the inner circumferential surface of the boss section coupled to the second coupling section to an outer circumferential surface of the cylinder section in the radial direction is 1.0 or more and 5.0 or less, and t(C)≥t(A), where t(A) represents thickness of an inner circumferential end of the diaphragm and t(C) represents thickness of the outer circumferential end of the diaphragm,
wherein 0.83≤t(A)/t(C)≤0.98.

2. The gear device according to claim 1, wherein t(C)≥t(A)>t(B), where t(B) represents thickness of a center portion of the inner circumferential end and the outer circumferential end of the diaphragm, and $$0.5 < t(B)/t(C) < 0.9.$$

3. The gear device according to claim 1, wherein t(C)≥t(A)>t(B), where t(B) represents thickness of a center portion of the inner circumferential end and the outer circumferential end of the diaphragm, and $$0.55 \leq t(B)/t(C) \leq 0.65.$$

4. The gear device according to claim 1, wherein t(C)≥t(A)>t(D), where t(D) represents thickness of the end portion of the cylinder section, and $$0.5 < t(D)/t(C) < 1.0.$$

5. The gear device according to claim 1, wherein t(C)≥t(A)>t(D), where t(D) represents thickness of the end portion of the cylinder section, and $$0.6 \leq t(D)/t(C) \leq 0.9.$$

6. The gear device according to claim 2, wherein t(B)<t(D), where t(D) represents thickness of the end portion of the cylinder section.

7. A robot comprising:
a first member;
a second member configured to turn with respect to the first member;
the gear device according to claim 1 configured to transmit a driving force for turning the second member relatively to the first member; and
a driving source configured to output the driving force to the gear device.

* * * * *